R. D. BRADEN & C. D. WRIGHT.
AUTOMOBILE POWER TRANSMITTING APPARATUS.
APPLICATION FILED APR. 3, 1916.
1,243,649.
Patented Oct. 16, 1917.
2 SHEETS—SHEET 1.
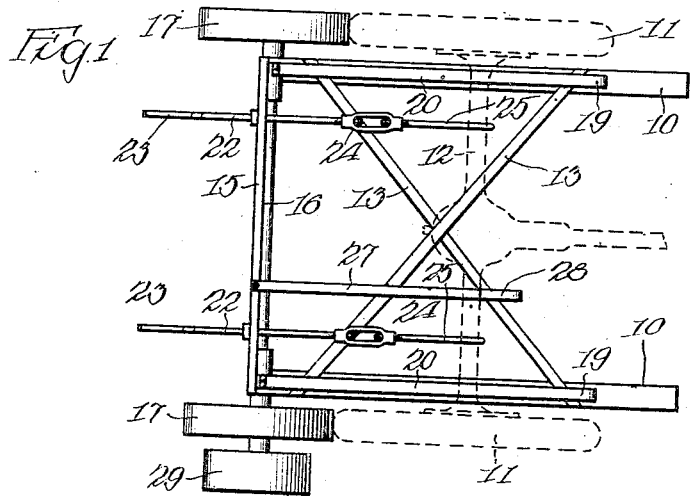
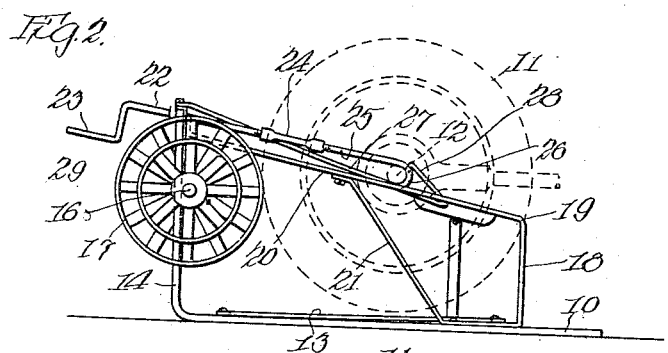
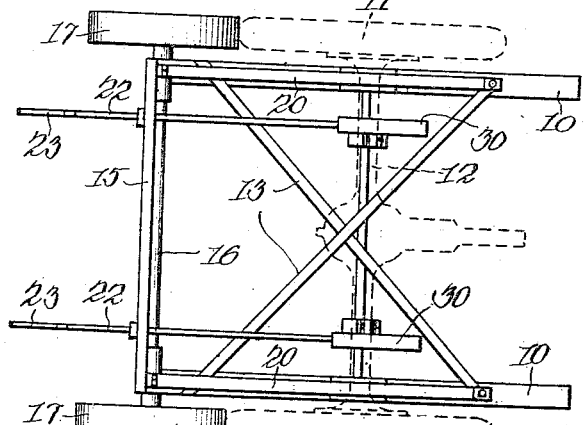
Witness
Leo J. DuMais.
Inventor:
Robert D. Braden &
Charles D. Wright
By Chas. A. Tillman, Atty.

R. D. BRADEN & C. D. WRIGHT.
AUTOMOBILE POWER TRANSMITTING APPARATUS.
APPLICATION FILED APR. 3, 1916.
1,243,649.
Patented Oct. 16, 1917.
2 SHEETS—SHEET 2.
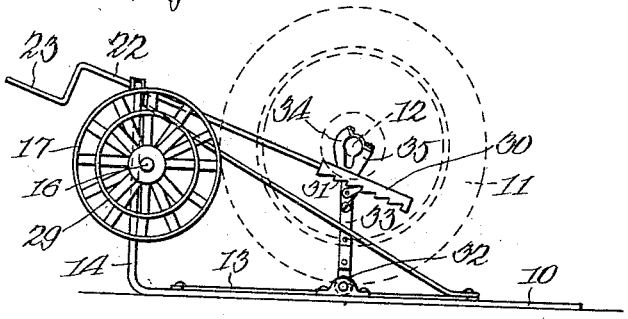
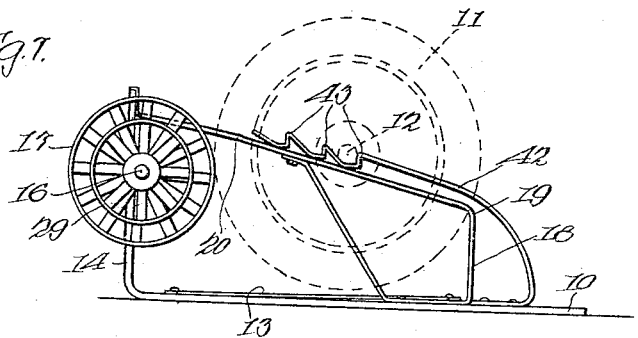
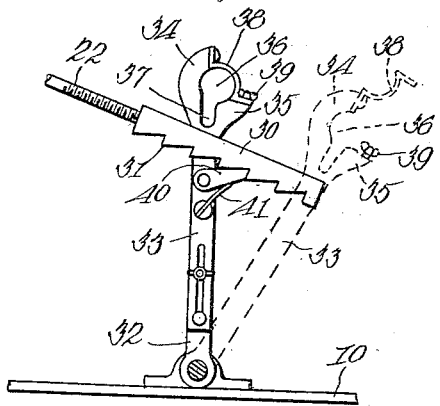
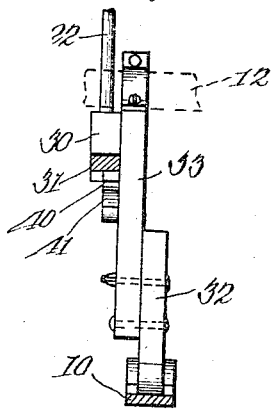
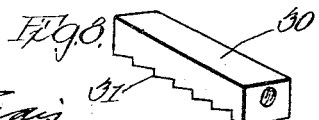

UNITED STATES PATENT OFFICE.

ROBERT D. BRADEN, OF CHICAGO, ILLINOIS, AND CHARLES D. WRIGHT, OF TOLEDO, OHIO.

AUTOMOBILE POWER-TRANSMITTING APPARATUS.

1,243,649.   Specification of Letters Patent.   Patented Oct. 16, 1917.

Application filed April 3, 1916. Serial No. 88,480.

*To all whom it may concern:*

Be it known that we, ROBERT D. BRADEN, a resident of Chicago, in the county of Cook and State of Illinois, and CHARLES D. WRIGHT, a resident of Toledo, in the county of Lucas and State of Ohio, both citizens of the United States, have invented certain new and useful Improvements in Automobile Power-Transmitting Apparatus, of which the following is a specification.

This invention relates to improvements in a power transmitting apparatus, to be used in connection with an automobile or other motor driven vehicle for transmitting power from the rear or driven wheels of such vehicle to a machine or part to be driven by such transmitted power, and it consists in certain peculiarities of the construction, novel arrangement and operation of the various parts thereof as will be hereinafter more fully set forth and specifically claimed.

The object of the invention is to provide a portable, strong, efficient and economical apparatus of the above mentioned general character, which can be readily placed in such position that a motor driven vehicle, such as an automobile can be easily mounted thereon and automatically engaged and held with its driven wheels in engagement with certain parts of the apparatus, to the end, that power from the driven wheels of the vehicle can be transmitted to machines, such as corn shellers, feed grinders or cutters, sawing machines, cider mills, fans and the like, for the purposes of operating them. Another object of the invention is to so construct the apparatus that the motor vehicle can be mounted thereon for operation, without being lifted or "jacked up," and when so mounted, can be securely held or readily released and dismounted. Other objects and advantages of the invention will be disclosed in the subjoined description and explanation.

In the accompanying drawings which serve to illustrate an embodiment of the invention—

Figure 1 is a plan view of one form of the apparatus showing by dotted lines the rear axle and wheels of a motor driven vehicle held in contact with pulleys on the driven shaft of the apparatus.

Fig. 2 is a side view thereof.

Fig. 3 is a plan view similar to Fig. 1 but showing a modification in the means for holding the rear axle and the wheels of the vehicle in the desired position to cause said wheels to contact with the pulleys on the driving shaft of the apparatus.

Fig. 4 is a side view thereof.

Fig. 5 is a slightly enlarged view of one of the pivoted and adjustable supporting standards for the rear axle of the vehicle and a part of the rack bar for holding the same in position, illustrating by dotted lines about the position to which the standards can be turned to receive the rear axle of the vehicle.

Fig. 6 is a face view of the parts shown in Fig. 5.

Fig. 7 is a side view of the apparatus showing another modified construction of the means for holding the rear axle of the vehicle at the desired position on the apparatus, and Fig. 8 is a perspective view of one of the rack bars used in the construction shown in Figs. 3 and 4.

Like numerals of reference refer to corresponding parts throughout the different views of the drawings.

The frame of the apparatus consists of a pair of parallel and horizontal base plates or bars 10 which are by preference located at a sufficient distance apart to permit them to be inserted or located between the rear wheels 11 on the rear axle 12 of an automobile or motor driven vehicle, as will be understood by reference to Figs. 1 and 3 of the drawings. The base members 10 are secured together by means of brace bars 13 which are by preference crossed and are located diagonally with respect to the said members. Each of the bars 10 is provided at its rear end with an upright portion 14 which portions are connected together by a cross piece 15, and may be otherwise strongly braced. Horizontally journaled on the uprights 14 is a driven shaft 16 on which is mounted a pair of friction pulleys 17 which are adapted to aline and contact with the wheels 11 of the vehicle. Extended from near the front end of each of the base members 10 upwardly to a point a slight distance below the normal height of the vehicle axle 12 is a supporting bracket 18 each of which is provided with an elbow 19 and has rearwardly and upwardly extended from said elbow an extension 20 which is secured to the rear upward portion 14 of each of the base members, or to the rear upright portion of the frame of the apparatus. Each of these extensions 20 is by preference supported by a brace 21 extended from the base 10 upwardly and rearwardly to about the middle of said extension. Rotatably and loosely mounted on the rear portion 15 of the frame of the apparatus are a pair of rods 22, each of which has on its rear portion a crank handle 23 used for turning the same. As shown, these rods 20 are located near the ends of the shaft 16 or pulley 17 thereon and extend longitudinally with respect to the frame of the apparatus. Connected by means of a turn-buckle 24 to the front end of each of the rods 22 is a rod 25 which has at its front end a hook 26 to engage the rear axle 12 of the vehicle when the same has been placed in its operative position. Secured to the rear or upright portion 15 of the frame of the apparatus, and at one side of the middle thereof, at one of its ends, is a forwardly extended spring-arm 27 which has at its forward or free end a forwardly and downwardly inclined portion 28 which terminates at its rear end in a downwardly extended portion adapted to engage the front surface of the rear axle 12 of the vehicle, when the same has been placed in operative position. Mounted on the driven shaft 16 of the apparatus is a pulley 29 to which a belt may be applied for transmitting power therefrom to the machine or part to be operated, not shown.

In Fig. 3 of the drawing is shown a modification in the construction of the apparatus, which is identical with that just above described, except that the automatically engaging spring arm 27 is omitted, and that instead of the crank handle arms 23 being provided with turn-buckles, said turn-buckles are omitted, and a rack bar 30, having ratchet teeth 31 on its lower surface is mounted in screw-threaded engagement on the front end of each of the rods 22 as will be clearly understood by reference to Fig. 5 of the drawings. In this modified construction a standard 32 is pivotally mounted at its lower end on the base of the apparatus, at a point near and below each of the rack bars 30, and each of said pivoted standards 32 has adjustably secured and vertically mounted thereon a standard 33, the upper end of each of which is provided with prongs 34 and 35, see Figs. 4 and 5 of the drawings, between which prongs is provided an opening 36 for the reception of the rear axle of the vehicle, which opening is by preference provided with a downward extension 37 for the reception of the truss of said axle. Pivotally secured at one of its ends to the prong 34 is a latch or fastener 38 which is adapted to embrace the rear axle 12 when the same is placed in position between the prongs 34 and 35, and which fastener may be secured at its other end by means of a set screw 39 seated in the prong 35 and engaging a suitable opening or slot in the fastener or latch 38, so that the rear axle 12 may be secured in position between said forks in such a manner as to prevent accidental displacement thereof. Pivotally mounted on each of the parts 33 of each of the standards 32 is a pawl 40, each of which is pressed into engagement with the ratchet teeth 31 by means of a spring 41 fastened to the piece 33 and resting at its free end against the lower portion of said pawl.

In Fig. 4 we have shown another modification in the construction of the device which consists in omitting the supporting brackets consisting of the upright portions 18, elbows 19, and rearwardly and upwardly inclined extensions 20, and in simply using the pivoted standards 32 equipped at their upper ends with suitable bearings for the rear axle of the vehicle.

In Fig. 7 of the drawing is shown still another modification, which consists in employing the frame of the apparatus constructed as shown in Figs. 1 and 2 of the drawings, but omitting the crank rods 22 and spring arm 27, but in employing a spring arm 42 which is secured at its front end to the base 10 of the frame of the apparatus and extended upwardly and rearwardly alongside one of the brackets or extensions 20. This spring arm 42 is provided with a series of ratchet teeth 43 on its upper surface to engage the front surface of the rear axle 12 so as to hold the wheels 11 thereon in contact with the friction pulleys 17 on the driven shaft of the apparatus. By using several of the ratchet teeth 43 on the arm 42 it is apparent, that vehicles having wheels of different sizes may be suitably held on supports 20 at the proper distance to cause their wheels to contact with said pulleys.

From the foregoing and by reference to the drawings, it will be clearly understood and readily seen that when the apparatus constructed as shown in Figs. 1, 2, 3 and 7 of the drawings is used, the apparatus may be suitably located, when the automobile may be moved or backed with its rear axle toward the supporting brackets or extensions 20, when by reason of the fact that the elbows 19 of said brackets, are located at a point slightly below the normal position of the rear axle 12, it is obvious that said axle will ride on the extensions 20 and be elevated thereby so that the wheels 10, will be out of contact with the ground or floor, yet will impinge the friction pulleys 17 on the driven shaft of the apparatus. In this operation the part 28 of the spring arm 27, when the construction shown in Figs. 1 and 2 is employed, will be depressed by contact with the axle 12 until the axle passes over the rear upper portion of said part, when it is apparent that the part 28 will automatically engage the axle and hold the wheels 11 in contact with the friction pulleys 17 of the apparatus. To further secure the axle in position the crank rods 22 and hooked rods 25 can be used as is manifest. When the construction illustrated in Figs. 3, 4 and 5 is employed, it is apparent that the forked standards 32 may be tilted forwardly to about the position shown in Fig. 5, by dotted lines when the rear axle will fit in the recesses 36 of said standards and by the rearward movement of the vehicle, the rear axle will be elevated and held in the proper position for the wheels 11 thereon to contact with the pulleys 17, by means of the spring pressed pawls 40 engaging the rack bars 30, which can be suitably adjusted by turning the crank rods 22 in the proper direction. When the construction shown in Fig. 7 is employed, it is evident that the ratchet teeth 43 of the spring arm 42 will automatically engage the rear axle of the vehicle as said vehicle is backed up on the supporting brackets 20 to the desired point.

Having thus fully described our invention, what we claim as new and desire to secure by Letters Patent is—

In a power transmitting apparatus, the combination with a main or supporting frame, of a shaft horizontally journaled thereon, a pulley on said shaft, means on said shaft for transmitting power therefrom, means for elevating and supporting an axle in parallelism with said shaft, means to automatically engage the axle of a vehicle and to hold it in a given position with respect to said shaft, a crank rod longitudinally and loosely journaled on the supporting frame, a turn buckle connected at one of its ends to said crank rod, another rod connected at one of its ends to the other end of the turn buckle and having at its free end a hook to engage said axle.

ROBERT D. BRADEN.
CHARLES D. WRIGHT.

Witness:
CHAS. C. TILLMAN.

Copies of this patent may be obtained for five cents each, by addressing the "Commissioner of Patents, Washington, D. C."